United States Patent Office 3,229,491
Patented Jan. 18, 1966

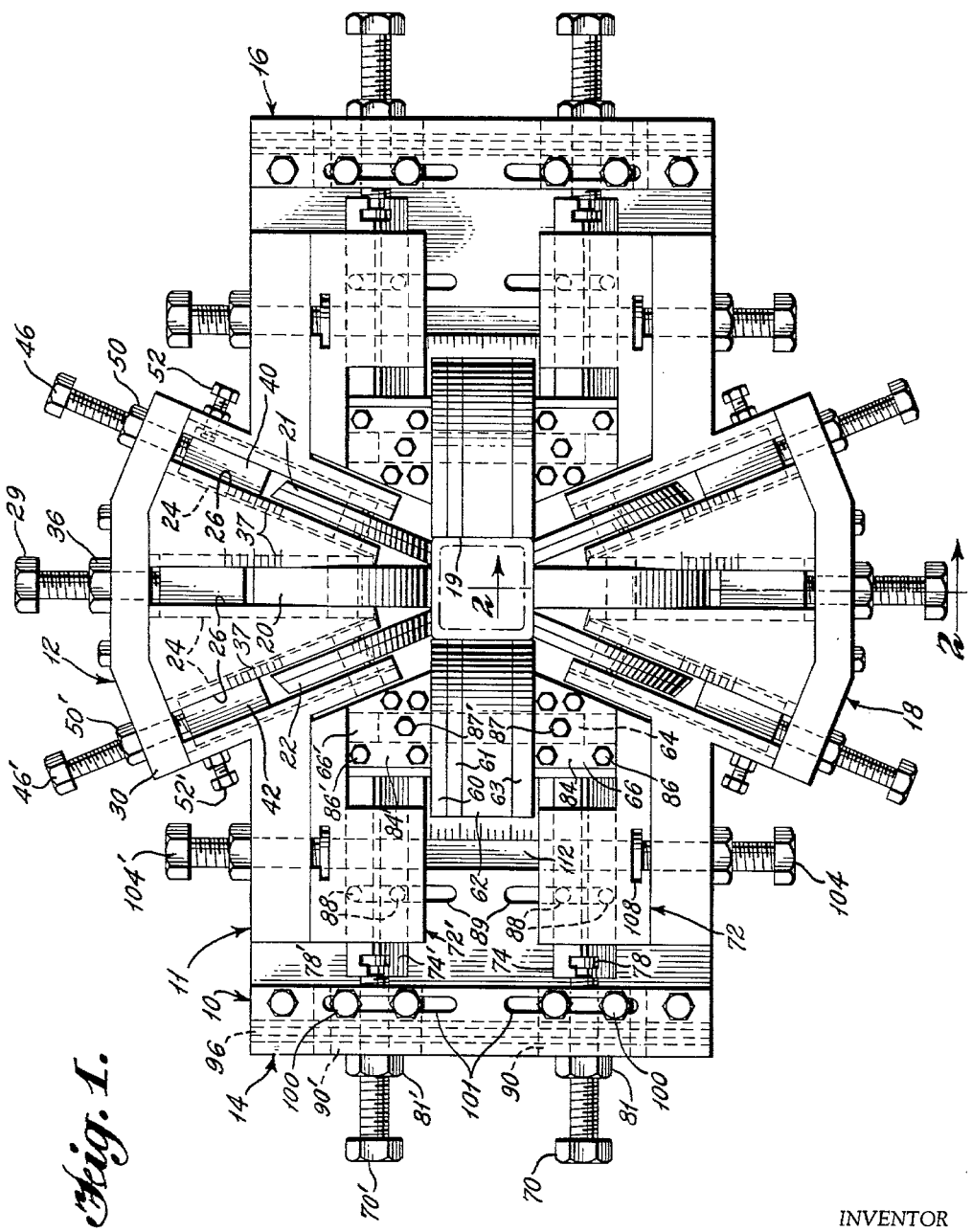

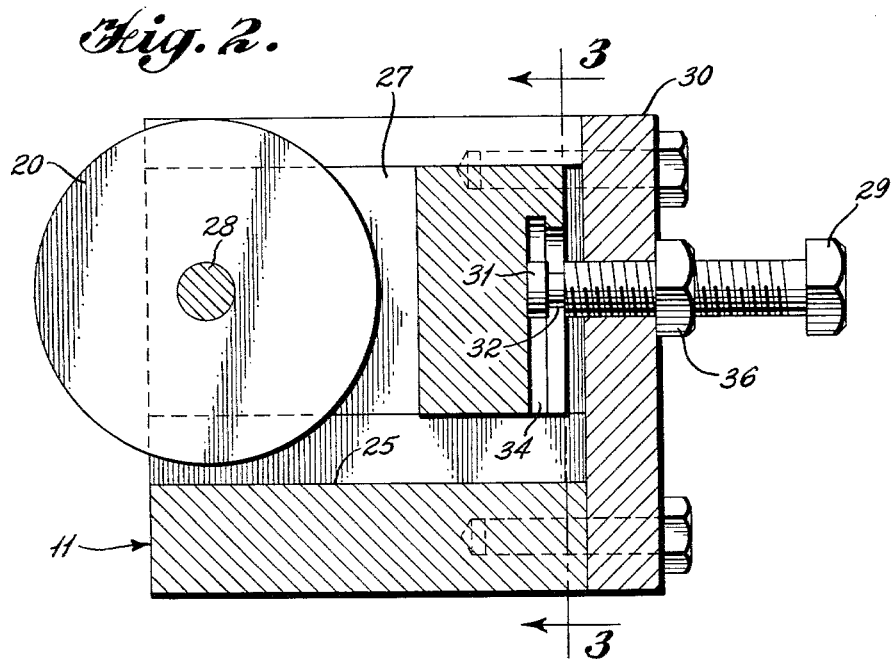
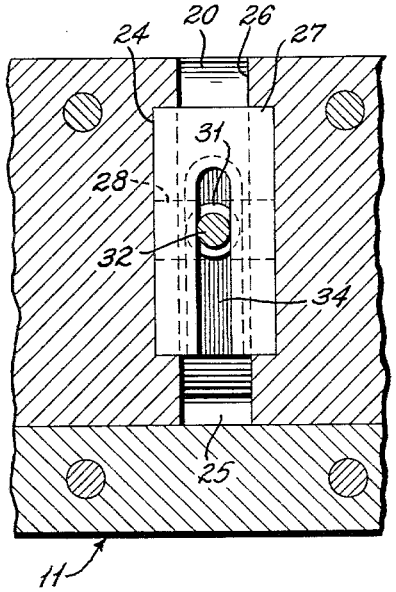
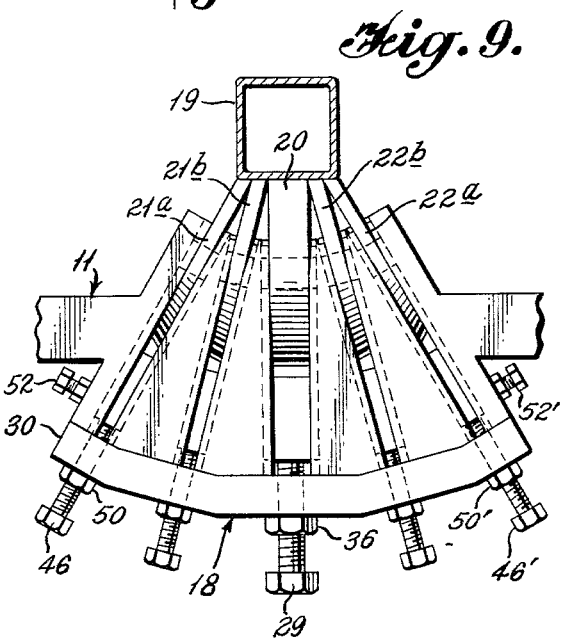

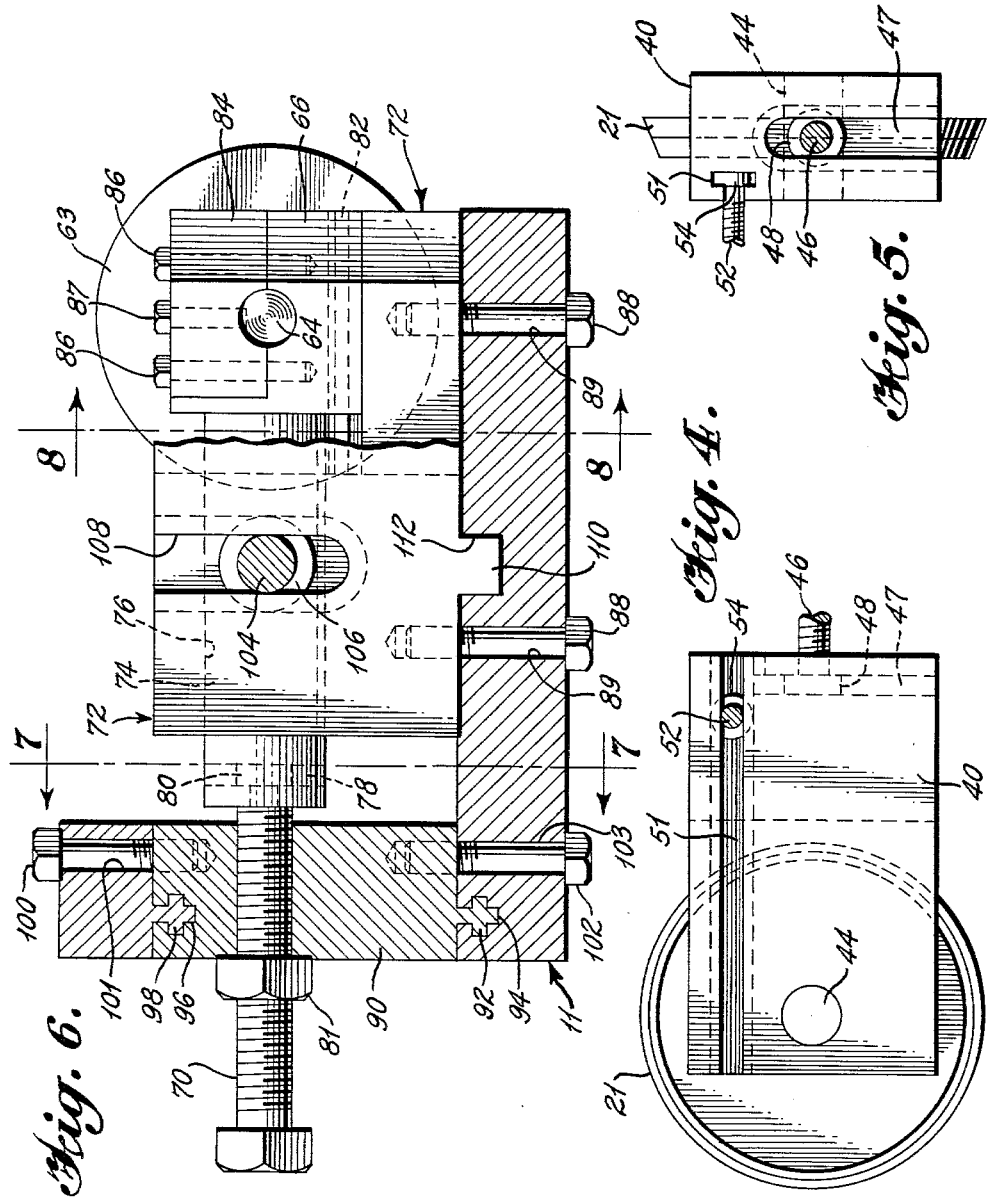

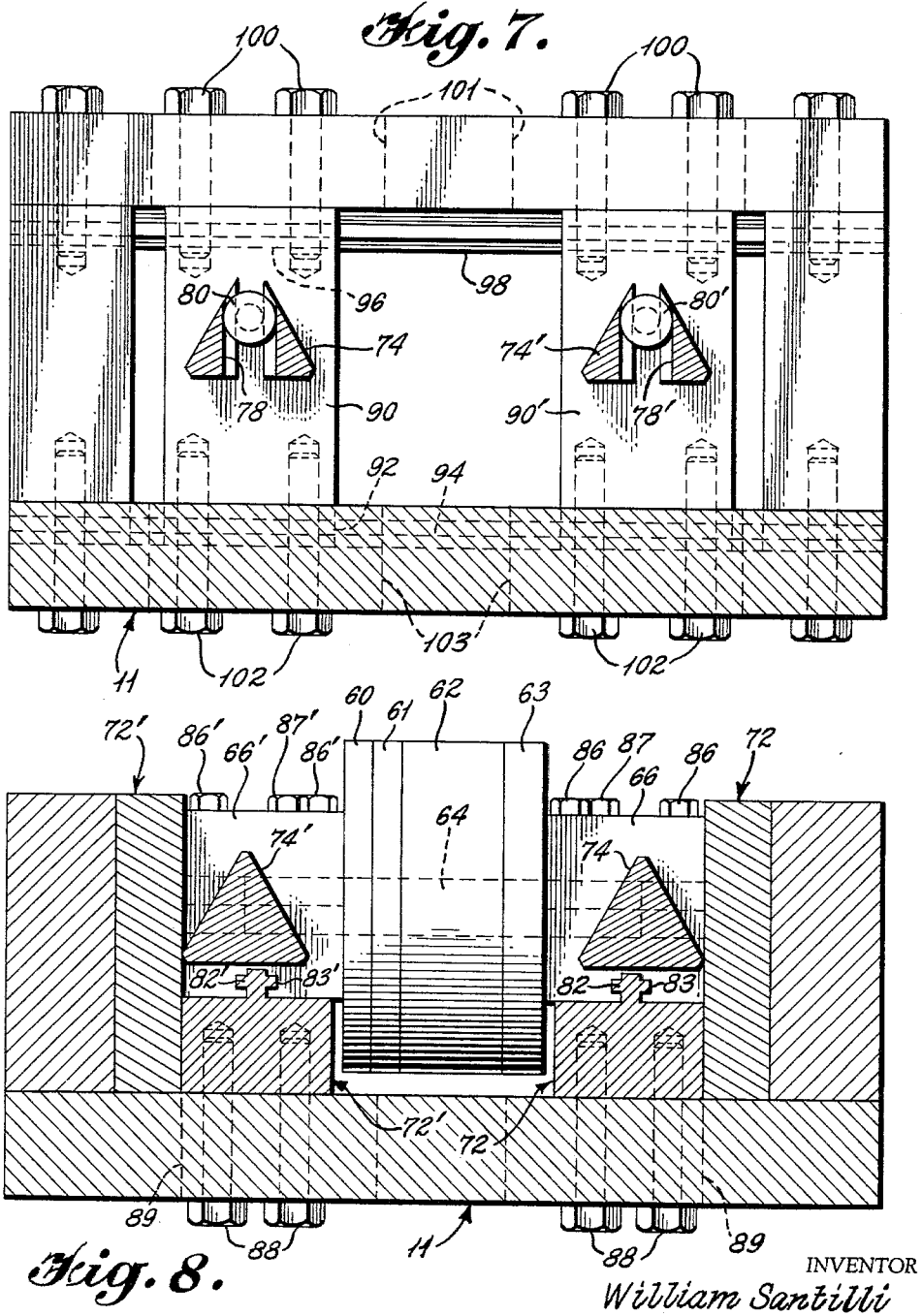

3,229,491
TUBE FORMING CHUCK
William Santilli, Fort Lauderdale, Fla.
(671 Larkfield Road, Commack, Long Island, N.Y.)
Filed Aug. 5, 1963, Ser. No. 299,967
13 Claims. (Cl. 72—224)

This invention relates generally to tube forming chucks and more specifically to chucks which are adjustable for forming tubes and pipes of various sizes.

It has heretofore been the practice to provide chucks having a plurality of sets of rolls to shape initially a tube into a particular cross-sectional form. This is usually referred to as the tube breaking operation. The tube is then placed into a second chuck with sets of the rolls to finish shaping the tube into its final form. This is referred to as the tube finishing chuck operation. For each particular cross-sectional form, a predetermined number of rolls are necessary.

For example, with presently known machines, the chuck is prepared to form a 1" x 1" square tube by utilizing a a particular set of rolls. If it is desired to form a 1½" x 1½" square tube, the chucks would be disassembled and a new set of rolls would be installed in both the breaking and finishing chucks. The procedure of changing the sets of rolls has required normally three to four hours, and at times has required as much as eight hours.

The adjustment of the rolls heretofore has been accomplished by a generally haphazard method. The adjustment of the rolls is determined by running tubes through the chucks and measuring the finished tube to ascertain whether the adjustment of the rolls is proper to obtain the desired dimensions of the tube.

Further, because of the necessity of different sets of rolls to form tubes of various sizes, a large inventory of rolls is necessary to provide sufficient rolls for obtaining various desired dimensions. Each chuck requires four sets of rolls, therefore in some instances it has been necessary to maintain five hundred sets of rolls to obtain tubes of sizes ranging from 1" to 4" square and rectangular.

It is an object of this invention, therefore, to overcome these problems.

It is another object of this invention to provide a chuck which eliminates the necessity of maintaining a large inventory of rolls.

It is a further object of this invention to provide a chuck which substantially eliminates the necessity to change the rolls in a chuck to obtain tubes of various sizes.

It is a still further object of this invention to provide a chuck wherein the rolls are adapted for adjustment within the chuck to vary accurately the dimensions of the tube, as desired.

These and other objects of the invention may be accomplished according to one embodiment of the invention wherein the chuck is provided with a top roll section, a pair of side roll sections, and a bottom roll section, which are adjustably mounted on the chuck frame so that tubes of various sizes may be formed by the chuck without the necessity of removing the rolls.

This embodiment is disclosed in the accompanying drawings in which:

FIG. 1 is a front elevational view of the chuck;

FIG. 2 is a partial sectional view taken on line 2—2 of FIG. 1;

FIG. 3 is a partial sectional view taken on line 3—3 of FIG. 2;

FIG. 4 is a side elevational view of one of the adjustable carriages of the top roll section;

FIG. 5 is a rear elevational view of the carriage shown in FIG. 4;

FIG. 6 is a side view of one of the side roll carriages partially in section;

FIG. 7 is a sectional view taken on line 7—7 of FIG. 6;

FIG. 8 is a sectional view taken on line 8—8 of FIG. 6; and

FIG. 9 is a partial view of a modification of the top and bottom roll sections.

The chuck 10 comprises a frame 11 to support four sections of rolls including a top roll section 12, a pair of side roll sections 14 and 16, and a bottom roll section 18. The roll sections support the rolls in a manner so that the rolls define an opening 19 through which the tube is drawn to shape it into the desired form. Each of the roll sections is adapted so that the rolls supported thereby are adjustable to form the tubes of various dimensions.

The top roll section 12 and the bottom roll section 18 are identical in construction and it will therefore be sufficient to describe only one of these sections. The top roll section 12 includes an inboard roll 20, and two outboard rolls 21 and 22. The rolls 20, 21 and 22 are of a predetermined width so as to obtain the desired combinations of dimensions of the tube. The inboard roll 20, as disclosed in the preferred embodiment, is of a different width than the two outboard rolls 21 and 22 which are of substantially the same width.

The rolls 20, 21 and 22 are supported for movement in longitudinal guideways 24 in the frame 11. The guideways 24 extend from the opening 19 to the edge of the frame 11. The center guideway is substantially vertical and the outer guideways extend at an angle diverging from the center guideway.

The cross-sectional shape of the guideways 24 may best be seen in FIG. 3 of the drawings and is substantially rectangular, having a channel portion 25 extending into the rear portion of the frame 11. A slot 26 is provided in the front surface of the frame 11 opposite the channel 25.

The inboard roll 20 is shown in FIGS. 2 and 3 and is rotatably supported on a carriage 27 which is slidably mounted in the guideway 24 with portions of the roll extending into the channel 25 and the slot 26. The carriage 27 is substantially U-shaped and has a pin 28 extending between the legs thereof on which the roll 20 is mounted. Means are provided to move the carriage and the roll longitudinally of the guideway 24 to the desired position relative to the opening 19. For this purpose, an adjusting screw 29 is supported threadably in a backplate 30 which is removably secured to the frame 11. The adjusting screw 29, in the preferred embodiment, is removably secured to the carriage 27. The inner end of the adjusting screw 29 is provided with a head 31 and a reduced neck portion 32. The head 31 is slidably received in a keyway 34 formed in one end of the carriage 27.

It will thus be understood, that by screwing the adjusting screw 29 inwardly or outwardly relative to the backplate 30, the carriage 27 will be moved longitudinally of the guideway 24 to position the roll 20 as desired. A lock nut 36 may be provided to secure the adjusting screw 29 in any desired position.

Scale means 37 may be provided on the frame 11 adjacent each slot 26 to facilitate positioning the roll as desired.

The outboard rolls 21 and 22 are rotatably supported on carriages 40 and 42 which are movably mounted in the inclined guideways 24. The carriage 40, which supports the outboard roll 21 is similar to the carriage 27 supporting the inboard roll in that it is substantially U- shaped and is provided with a shaft 44 extending between the legs thereof on which the roll 21 is supported. The carriage 40 may also be removably connected to an adjusting screw 46 which is threadably secured through the backplate 30. The carriage 40 is provided with a keyway 47 to receive a head 48 on the end of the adjusting screw 46. The carriage 40 carrying the roll 21 may thus be moved longitudinally of the guideways 24 by screwing the adjusting screw 46 inwardly or outwardly relative to the backplate 30. A lock nut 50 may also be provided to secure the adjusting screw 44 in its desired position.

A further keyway 51 extending along one wall of the carriage 40 opening laterally thereof is provided for lateral adjustment of the outboard carriage 40. An adjusting screw 52 extends through the frame 11 and has a head 54 slidably received within the keyway 51. Movement of the screw 52 relative to the frame 11 will move the carriage 40 toward or away from the inboard roll 20. Clearance is provided in the guideway 24 to permit some lateral movement of the carriage 40 within the guideway. The keyway 46 is of a sufficient width so it also will permit lateral movement of the carriage 40 relative to the screw 46.

The keyway 50 extends the full length of the carriage so that the carriage may be moved longitudinally of the runway without interference by the adjusing screw 52.

The other outboard roll 22 is supported on a carriage 42 which is a mirror image of the carriage 40. The carriage 42 is adjusted longitudinally of the guideway 24 by the adjusting screw 46' and is adjusted laterally of the guideway by the adjusting screw 52'.

The peripheral surface of each of the outboard rolls 21 and 22 is beveled to form a surface parallel to the peripheral surface of the inboard roll 20.

The side roll sections 14 and 16 are also identical in structure and it will therefor suffice to discuss in detail the one side roll section 14.

The side roll section 14 comprises a plurality of rolls 60, 61, 62 and 63 which are adapted for movement toward and away from the opening 19. The rolls 60, 61, 62 and 63 are mounted on a common shaft 64 which is journaled at each end thereof in bearing blocks 66 and 66'. The bearing blocks 66 and 66' are operatively connected to adjusting screws 70 and 70'.

Referring to FIG. 6, the bearing block 66 is slidably supported on a housing 72 for movement relative thereto. A triangular shaft 74 is rigidly secured to the bearing block 66 and extends through a triangular bore 76 in the housing 72. The free end of the triangular shaft 74 is provided with a keyway 78 to receive a head 80 on the adjusting screw 70. A lock nut 81 may be provided to secure the adjusting screw 70 in its desired position.

The housing 72 may be provided with a key 82 which cooperates with a key slot 83 in the bearing block 66 to provide for lateral stability of the bearing block 66 as it moves on the surface of the housing 72.

The bearing block 66' is mounted similarly on a housing 72' for movement relative thereto. A triangular cross-sectional shaft 74' extends through a triangular bore 76' in the housing 72' and is connected rigidly to the bearing block 66'. The shaft 74' is connected to its adjacent adjusting screw 70' by means of a slot 80' receiving a head 78' on the adjusting screw 70'. A lock nut 81' may also be provided to secure the adjusting screw 70' in the desired position.

A key 82' is provided on the housing 72' which cooperates with a key slot 83' in the bearing block 66' to provide for lateral stability of the bearing block during its movement relative to the housing 72'.

It will thus be understood that by adjusting the screws 70 and 70' the bearing blocks 66 and 66' may be moved toward or away from the opening 19 carrying therewith the rolls 60, 61, 62 and 63.

Further provision is made to vary the width of the set of rolls 60, 61, 62 and 63. The rolls 60, 61, 62 and 63 may be removed from the shaft 64 and various combinations of these rolls may be used to obtain the desired width of rolling surface. As illustrated, the set of rolls 60, 61, 62 and 63 obtain the maximum width of rolling surface and in this instance it is a width of four inches. If the rolling surface of the rolls 60, 61, 62 and 63 were reduced to 2 inches, it would be necessary to remove some of the rolls and then move the bearing blocks 66 and 66' toward each other to maintain the remaining rolls in place on the shaft 64.

The bearing blocks 66 and 66' are adapted to permit removal of the shaft 64 so that the various combinations of rolls may be easily obtained.

The bearing blocks 66 and 66' are provided with removable plates 84 and 84' which are secured thereto by bolts 88 and 86'. Set screws 87 and 87' are threadably engaged in the removable portions 84 and 84' and engage the shaft 64 to prevent axial movement of the shaft 64 relative to the bearing blocks 66 and 66'.

The plates 84 and 84' are thereby easily removed from the bearing blocks 66 and 66' to permit removal of the shaft 64 to enable the desired combination of rolls to be placed thereon.

The bearing blocks 66 and 66' may be moved toward or away from each other by unscrewing the holding bolts 88 which extend through elongated slots 89 in the frame 11 of the chuck 10 into the housings 72 and 72'. The holding bolts 88 secure the housing 72 in any desired position relative to the frame 11.

The adjusting screws 70 and 70' are threadably secured in blocks 90 and 90' which are slidably supported in the frame 11. As shown in FIG. 6, the block 90 is provided, on one sidewall, with a key 92 which slides in a keyway 94 provided in the frame 11. The block 90 is also provided, on the opposite sidewall, with a keyway 96 which receives a key 98 formed on the frame 11.

Bolts 100 and 102 are provided which extend through elongated slots 101 and 103 in the frame 11 and threadably engage the blocks 90 and 90' to secure the blocks in any desired position.

It will thus be understood that after loosening all of the holding bolts 88 and the holding bolts 100 and 102, the housings 72 and 72' are free to move relative to the frame 11. Adjusting screws 104 and 104' are provided in the frame 11 to move the housings 72 and 72'. The adjusting screws 104 and 104' are connected to the housings 72 and 72' in a manner similar to the connection of the other adjusting screws. As shown in FIG. 6, the adjusting screw 104 is provided with a head 106 slidably received in a slot 108 in the housing 72. The adjusting screw 104' is connected to the housing 72' in the same manner.

A key 110 is provided on the housing 72 which cooperates with a keyway 112 in the frame 11 to stabilize movement of the housing 72. A key is also provided on the housing 72'. A scale 113 may be provided on the frame to facilitate positioning the bearing blocks.

The embodiment disclosed in FIG. 9 of the drawings shows a modification of the top section 12 and the bottom section 18. In the modified form, a pair of outboard rolls 21a and 21b are provided in lieu of the single outboard roll 21 and a further pair of outboard rolls 22a and 22b are provided in lieu of the single outboard roll 22.

The rolls 21a, 21b, 22a and 22b are supported in the same manner as the rolls 21 and 22 with the exception that the carriages supporting the rolls 21b and 22b are not adjustable toward the inboard roll 20.

In this manner, the chuck is adjusted easily to form tubes of various dimensions. The top and bottom roll sections 10 and 16 include rolls which need never be removed from the chuck but may be adjusted to the desired position by their associated adjusting bolts.

If a small size tube is to be formed, the outboard rolls of the top roll section 12 and the bottom roll section 18 may be retracted to an inoperative position, and only the inboard rolls would act on the tube.

The side roll sections 14 and 16 may be quickly and easily adjusted inwardly and outwardly relative to the opening 19 defined by the peripheral surfaces of the rolls by manipulation of their associated adjusting bolts. The width of the set of rolls 60, 61, 62 and 63 may be varied easily by removal of the rolls and shaft 64, and placing thereon the desired combination of rolls to obtain the proper width. The supporting structure of the rolls 60, 61, 62 and 63 and the shaft 64 may then be adjusted easily and quickly by its associated adjusting screws 104 and 104".

With a chuck of this construction the need for a large inventory of rolls is not necessary. The time required for changing the chuck to produce a tube of different dimensions is greatly reduced and the labor involved is reduced considerably. It can thereby be easily understood that the chuck of the present invention will reduce the cost of forming such tubes considerably.

While the invention has been described and illustrated in a certain embodiment, it is understood that various changes may be made therein without departing from the invention as defined in the claims.

I claim:

1. A tube drawing chuck comprising a frame; a plurality of roll sections arranged to define an opening through which a tube may be drawn to shape said tube into a predetermined cross-section; said plurality of roll sections including a plurality of rolls, means for supporting said rolls for movement toward and away from said opening, a pair of said sections being similar in structure, and each section of said pair including a plurality of rolls mounted on a common shaft.

2. A tube forming chuck comprising a frame; a plurality of roll sections arranged to define an opening through which a tube may be drawn to shape said tube into a predetermined cross-section; said plurality of roll sections including a plurality of rolls, means for supporting said rolls for movement toward and away from said opening, a pair of said sections being similar in structure, each section of said pair including a plurality of rolls mounted on a common shaft, and bearing members slidably mounted in said frame for supporting said shaft.

3. A tube forming chuck comprising a frame; a plurality of roll sections arranged to define an opening through which a tube may be drawn to shape said tube into a predetermined cross-section; at least one of said roll sections including a plurality of rolls mounted for rotation on a common shaft, means for supporting said rolls for movement toward and away from said opening, bearing members slidably mounted in said frame for supporting said shaft, said frame including housings on which said bearing members are slidably mounted, and said housings being adapted for movement transverse to the movement of said bearing members.

4. A tube forming chuck comprising a frame; a plurality of roll sections arranged to define an opening through which a tube may be drawn to shape said tube into a predetermined cross-section; said plurality of roll sections including a plurality of rolls, means for supporting said rolls for movement toward and away from said opening, a pair of said sections being similar in structure, each section of said pair including a plurality of rolls mounted on a common shaft, bearing members slidably mounted in said frame for supporting said shaft, said frame including housings on which said bearing members are slidably mounted, said housings being adapted for movement transverse to the movement of said bearing members, and said bearing members being adapted to permit easy removal of said shaft.

5. A tube forming chuck comprising a frame; a plurality of roll sections arranged to define an opening through which a tube may be drawn to shape said tube into a predetermined cross-section; each of said roll sections including a plurality of rolls, means for supporting said rolls for movement toward and away from said opening, a first pair of said sections being on opposite sides of said opening, each section of said first pair including an inboard roll and an outboard roll disposed on each side of said inboard roll, a second pair of said sections being on opposite sides of said opening and between the sections of said first pair, each section of said second pair including a plurality of cylindrical rolls mounted on a common shaft.

6. A tube forming chuck comprising a frame; a plurality of roll sections arranged to define an opening through which a tube may be drawn to shape said tube into a predetermined cross-section; each of said roll sections including a plurality of rolls, means for supporting said rolls for movement toward and away from said opening, a first pair of said sections being on opposite sides of said opening, each section of said first pair including an inboard roll and an outboard roll disposed on each side of said inboard roll, said inboard rolls and said outboard rolls being mounted on individual carriages, a second pair of said sections being on opposite sides of said opening and between the sections of said first pair, each section of said second pair including a plurality of rolls mounted on a common shaft, and bearing members slidably mounted in said frame for supporting said shaft.

7. A tube forming chuck comprising a frame; a plurality of roll sections arranged to define an opening through which a tube may be drawn to shape said tube into a predetermined cross-section; each of said roll sections including a plurality of rolls, means for supporting said rolls for movement toward and away from said opening, a first pair of said sections being on opposite sides of said opening, each section of said first pair including an inboard roll and an outboard roll disposed on each side of said inboard roll, said inboard rolls and said outboard rolls being mounted on individual carriages, a second pair of said sections being on opposite sides of said opening and between the sections of said first pair, each section of said second pair including a plurality of rolls mounted on a common shaft, bearing members slidably mounted in said frame for supporting said shaft, said frame including housings on which said bearing members are slidably mounted, and said housings being adapted for movement transverse to the movement of said bearing members.

8. A tube forming chuck comprising a frame; a plurality of roll sections arranged to define an opening through which a tube may be drawn to shape said tube into a predetermined cross-section; each of said roll sections including a plurality of rolls, means for supporting said rolls for movement toward and away from said opening, a first pair of said sections being on opposite sides of said opening, each section of said first pair including an inboard roll and an outboard roll disposed on each side of said inboard roll, said inboard rolls and said outboard rolls being mounted on individual carriages, a second pair of said sections being on opposite sides of said opening and between the sections of said first pair, each section of said second pair including a plurality of rolls mounted on a common shaft, bearing members slidably mounted in said frame for supporting said shaft, said frame including housings on which said bearing members are slidably mounted, said housings being adapted for movement transverse to the movement of said bearing members, and means for locking said rolls in a predetermined position.

9. A tube forming chuck comprising a frame, a plurality of roll sections, means mounting the roll sections on said frame at spaced intervals around an opening, at least one of said roll sections having an inboard roll and outboard rolls on opposite sides of said inboard roll, the central axes of said outboard rolls being in obtuse angular relation with the central axis of said inboard roll, and means for individually positioning said inboard and outboard rolls relative to said opening, said outboard rolls being frusto-conical and each having its apex on the side opposite said inboard roll, whereby the periphery of said outboard and inboard rolls may be aligned along said opening for forming a flat side on a tube as the tube passes through the opening.

10. A tube forming chuck comprising a frame, a plurality of roll sections, means mounting the roll sections on said frame at spaced intervals around an opening, said roll sections including a first roll section having an inboard roll and outboard rolls on opposite sides of said inboard roll, means for individually positioning said inboard roll and outboard rolls relative to said opening, means for adjusting the spacing between said outboard rolls and said inboard roll, said roll sections including a side roll section, said side roll section having a roll mounted for rotation on an axis at right angles to said inboard roll, said side roll section being adjacent said first roll section, and means for varying the length of said side roll, whereby said side roll section and said first roll section may be adjusted for forming tubes of various sizes.

11. A tube forming chuck comprising a frame, a plurality of roll sections, means mounting the roll sections on said frame at spaced intervals around an opening, said roll sections including a first roll section having an inboard roll and outboard rolls on opposite sides of said inboard roll, the central axes of said outboard rolls being in obtuse angular relation with the central axis of said inboard roll, means for individually positioning said inboard roll and outboard rolls relative to said opening, said outboard rolls being frusto-conical and each having its apex on the side opposite said inboard roll, means for adjusting the spacing between said outboard rolls and said inboard roll, said roll sections including a side roll section, said side roll section having a roll mounted for rotation on an axis at right angles to said roll inboard, means for adjusting the length of said side roll, and means for adjusting the position of said side roll relative to said opening, whereby said side roll and said one roll section may be adjusted for forming tubes of various sizes.

12. A tube forming chuck according to claim 10, wherein the periphery of said rolls is flat, whereby flat sides of various sizes are formed.

13. A tube forming chuck comprising a frame, a plurality of roll sections, means mounting the roll sections on said frame at spaced intervals around an opening, a first pair of roll sections on opposite sides of said opening, a second pair of roll sections on opposite sides of said opening and between the roll sections of said first pair, each section of said first pair having an inboard roll and outboard rolls, means for individually positioning said inboard roll and said outboard rolls relative to said opening, said outboard rolls being frusto-conical and each having its apex on the side opposite said inboard roll, means for adjusting the spacing between said outboard rolls and said inboard roll, each section of said second pair having a side roll mounted for rotation, means for adjusting the length of said side roll, and means for adjusting the position of said side roll relative to said opening, whereby polygonal tubes of various sizes may be formed by passing tubes through said opening.

References Cited by the Examiner
UNITED STATES PATENTS

| | | | |
|---|---|---|---|
| 14,551 | 4/1856 | Brooks | 80—34 |
| 384,422 | 6/1888 | Buschick | 80—28 |
| 921,042 | 5/1909 | Williams | 80—58 |
| 974,174 | 11/1910 | Morgan | 80—34 |
| 1,019,968 | 3/1912 | Koenig | 80—34 |
| 2,352,675 | 7/1944 | Yoder | 80—58 |
| 2,789,450 | 4/1957 | Properzi | 80—28 |

CHARLES W. LANHAM, *Primary Examiner.*